US011026127B2

(12) United States Patent
Huang-Fu et al.

(10) Patent No.: US 11,026,127 B2
(45) Date of Patent: Jun. 1, 2021

(54) METHOD AND APPARATUS FOR INTER-SYSTEM CHANGE IN WIRELESS COMMUNICATION (71) Applicant: MEDIATEK INC., Hsinchu (TW)

(72) Inventors: Chien-Chun Huang-Fu, Hsin-Chu (TW); Yuan-Chieh Lin, Hsin-Chu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/274,847

(22) Filed: Feb. 13, 2019

(65) Prior Publication Data

US 2019/0253935 A1 Aug. 15, 2019

Related U.S. Application Data (60) Provisional application No. 62/630,803, filed on Feb. 14, 2018.

(51) Int. Cl.
*H04W 36/00* (2009.01)
*H04W 36/14* (2009.01)
(Continued)

(52) U.S. Cl.
CPC ....... *H04W 36/0016* (2013.01); *H04W 36/14* (2013.01); *H04W 76/12* (2018.02); *H04W 76/32* (2018.02); *H04W 84/042* (2013.01)

(58) Field of Classification Search
CPC ..... H04W 36/14; H04W 76/12; H04W 76/32; H04W 36/0016; H04W 84/042;
(Continued)

(56) References Cited

U.S. PATENT DOCUMENTS

2010/0246533 A1    9/2010  Lundin et al.
2011/0310850 A1*  12/2011  Klingenbrunn ....... H04W 36/30
                                                           370/332

(Continued)

FOREIGN PATENT DOCUMENTS

CN     101330713 A    12/2008
CN     101355796 A     1/2009
(Continued)

OTHER PUBLICATIONS

Combined Korean Office Action and Search Report dated Nov. 29, 2019 in corresponding Korean Patent Application No. 108104919 (with English Translation of Category of Cited Documents), 8 pages.

(Continued)

*Primary Examiner* — Oussama Roudani
(74) *Attorney, Agent, or Firm* — Oblon, McClelland, Maier & Neustadt, L.L.P.

(57) ABSTRACT

Aspects of the disclosure provide an electronic apparatus and methods for wireless communication. The electronic apparatus can include processing circuitry configured to identify, during an inter-system change of the electronic apparatus from a source network system to a target network system, at least one source session bearer between the electronic apparatus and the source network system. The processing circuitry can further map the at least one identified source session bearer to at least one target session bearer based on a mapping relationship that matches the at least one identified source session bearer with the at least one target session bearer to be established between the electronic apparatus and the target network system.

15 Claims, 3 Drawing Sheets (51) Int. Cl.
  *H04W 76/12* (2018.01)
  *H04W 76/32* (2018.01)
  *H04W 84/04* (2009.01)

(58) Field of Classification Search
  CPC ..... H04W 76/15; H04W 28/18; H04W 28/24; H04W 28/0252; H04W 28/0268; H04W 28/0263; H04W 76/16; H04W 84/045; H04W 92/20; H04W 88/06; H04L 45/24
  See application file for complete search history.

(56) References Cited

U.S. PATENT DOCUMENTS

| | | | |
|---|---|---|---|
| 2015/0195809 | A1 | 7/2015 | Sun et al. |
| 2017/0034749 | A1 | 2/2017 | Chandramouli et al. |
| 2018/0160348 | A1* | 6/2018 | Wu .................. H04W 36/0055 |
| 2019/0029057 | A1* | 1/2019 | Pan ...................... H04W 28/12 |
| 2019/0342932 | A1* | 11/2019 | Futaki .................. H04W 76/15 |
| 2020/0128452 | A1* | 4/2020 | Centonza .......... H04W 28/0263 |
| 2020/0305211 | A1* | 9/2020 | Foti .................... H04L 65/1016 |

FOREIGN PATENT DOCUMENTS

| | | |
|---|---|---|
| WO | WO 2008/125067 A1 | 10/2008 |
| WO | WO 2014/180192 A1 | 11/2014 |

OTHER PUBLICATIONS

English translation of the International Search Report and Written Opinion of the International Searching Authority dated Apr. 28, 2019 in PCT/CN2019/075048 filed Feb. 14, 2019, 8 pages.

ZTE, SA WG2 Meeting #120, S2-172154, Agenda Item 6.5.9, 5GS_ph1/Rel-15, "TS-23502P-CR to handover from EPS to NGS" Mar. 27-31, 2017, Busan, Korea, pp. 1-5.

Catt, SA WG2 Meeting #120, S2-172175, Agenda Item 6.5.9, 5GS_Ph1/Re1-15, TS 23.502: Discussion on EPS bearer ID allocation during inter-RAT handover from 5GS to EPS, Mar. 27-31, 2017, Busan Korea, pp. 1-6.

Intel,3 GPP TSG SA WG2 Meeting #121, Agenda item 6.5.5, 5G-Ph1/Rel-15, S2-173522, "Solution for Mobility in the EPC= 5GC direction" May 15-19, 2017, Hangzhou, P.R. China, pp. 1-4.

NTT Docomo, SA WG2 Meeting #119, Agenda Item 6, NextGen/ Rel-15, "Nx based Interworking Procedures From Qos Point of View", Feb. 13-17, 2017, Dubrovnik, Croatia, pp. 1-6.

* cited by examiner

METHOD AND APPARATUS FOR INTER-SYSTEM CHANGE IN WIRELESS COMMUNICATION

INCORPORATION BY REFERENCE

This present disclosure claims the benefit of U.S. Provisional Application No. 62/630,803 filed on Feb. 14, 2018, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless communications, a wireless communication device, such as a cellular phone, may need to switch from one network to another because of degradation in the received signal power from one network. To provide ubiquitous coverage, it is essential to ensure that the wireless communication device can access the service as the wireless communication device moves across the network coverage area.

SUMMARY

Aspects of the disclosure provide an electronic apparatus for wireless communication. The electronic apparatus can include processing circuitry configured to identify, during a current inter-system change of the electronic apparatus from a source network system to a target network system, at least one source session bearer between the electronic apparatus and the source network system. The processing circuitry is further configured to map the at least one identified source session bearer to at least one target session bearer based on a mapping relationship that matches the at least one identified source session bearer with the at least one target session bearer to be established between the electronic apparatus and the target network system. In an example, the electronic apparatus is in one of: an idle mode and a connected mode.

In an embodiment, the source network system is a fourth generation (4G) wireless communication network system, the target network system is a fifth generation (5G) wireless communication network system, the at least one identified source session bearer is an evolved packet system (EPS) bearer, and the at least one target session bearer includes one or more QoS flows. In an example, the mapping relationship indicates that the EPS bearer is associated with the one or more QoS flows. The processing circuitry can map the EPS bearer to the one or more QoS flows. In an example, the electronic apparatus further includes a transceiver configured to receive, from the 4G wireless communication network system, a mapping signal indicating that the EPS bearer is associated with the one or more QoS flows. The processing circuitry can process the mapping signal to obtain the mapping relationship.

In an embodiment, the source network system is a 5G wireless communication network system, the target network system is a 4G wireless communication network system, the at least one identified source session bearer comprises one or more QoS flows, and the at least one target session bearer is an EPS bearer. In an example, the mapping relationship indicates that the one or more QoS flows are associated with the EPS bearer. The processing circuitry can map the one or more QoS flows to the EPS bearer. In an example, the electronic apparatus further comprises a transceiver configured to receive, from the 5G wireless communication network system, a mapping signal comprising an EPS bearer identifier of the EPS bearer corresponding to the one or more QoS flows. The processing circuitry can process the mapping signal to obtain the mapping relationship.

In an embodiment, the mapping relationship can include at least one of: a mapping rule in the electronic apparatus indicating that the at least one source session bearer is associated with the at least one target session bearer and a mapping signal from the source network system. The mapping rule can be obtained from a previous inter-system change of the electronic apparatus from the target network system to the source network system. Further, the processing circuitry is further configured to update the mapping relationship based on one or more mapping signals from the source network system.

Aspects of the disclosure provide a method for wireless communication. The method includes identifying, by processing circuitry of an electronic apparatus during a current inter-system change of the electronic apparatus from a source network system to a target network system, a source session bearer between the electronic apparatus and the source network system. Further, the method includes mapping the identified source session bearer to at least one target session bearer based on a mapping relationship that matches the identified source session bearer with the at least one target session bearer to be established between the electronic apparatus and the target network system.

Aspects of the disclosure provide a method for wireless communication. The method includes identifying, by processing circuitry of an electronic apparatus during a current inter-system change of the electronic apparatus from a source network system to a target network system, at least one source session bearer between the electronic apparatus and the source network system. Further, the method includes mapping the at least one identified source session bearer to a target session bearer based on a mapping relationship that matches the at least one identified source session bearer with the target session bearer to be established between the electronic apparatus and the target network system.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
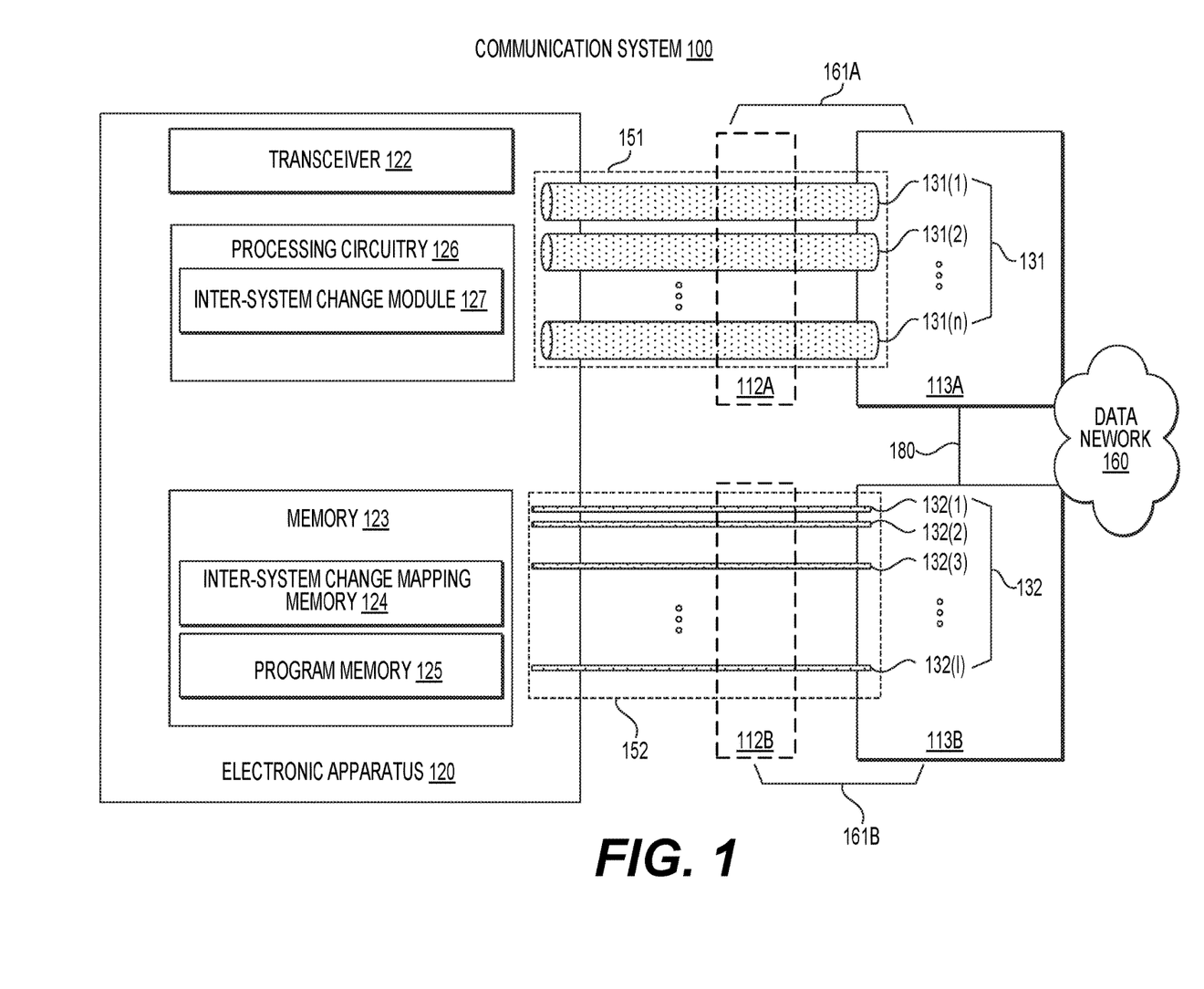
FIG. 1 shows an exemplary block diagram of a communication system 100 according to an embodiment of the disclosure.

FIG. 1 shows an exemplary block diagram of a communication system 100 according to an embodiment of the disclosure. The communication system 100 can include an electronic apparatus 120, two network systems including a first network system 161A and a second network system 161B, and a data network 160 providing wireless services to the electronic apparatus 120. The first network system 161A and the second network system 161B can be connected using an interface 180. In an embodiment, a first session 151 can include a first set of session bearers 131 associated with the first network system 161A and a second session 152 can include a second set of session bearers 132 associated with the second network system 161B. The first session 151 and the second session 152 can be configured to transmit data packets between the electronic apparatus 120 and the respective first and second network system 161A-B according to quality of service (QoS) characteristics that are associated with the first and second set of session bearers 131-132.

In an embodiment, an inter-system change for the electronic apparatus 120 can occur due to, for example, mobility of the electronic apparatus 120. During the inter-system change, the electronic apparatus 120 can be configured to switch from being served by a source network system before the inter-system change to being served by a target network system after the inter-system change. In a first embodiment, the source network system is the first network system 161A and the target network system is the second network system 161B. In a second embodiment, the source network system is the second network system 161B and the target network system is the first network system 161A.

According to aspects of the disclosure, in order to provide suitable quality of service including session continuity to the electronic apparatus 120, an inter-system change QoS coordination process (referred to as an inter-system change process) can be implemented as follows. At least one source session bearer between the electronic apparatus 120 and the source network system can be identified where the at least one source session bearer is to be mapped to at least one target session bearer that is between the electronic apparatus 120 and the target network system. Further, a mapping relationship between the at least one source session bearer and the at least one target session bearer can be obtained, and the at least one source session bearer can be mapped to the at least one target session bearer based on the mapping relationship. In the first embodiment, the at least one source session bearer can be one of the first set of session bearers 131, such as a first session bearer 131(1), and the at least one target session bearer can include at least one of the second set of session bearers 132. The mapping relationship indicates that the one of the first set of session bearers 131 is associated with the at least one of the second set of session bearers 132. In the second embodiment, the at least one source session bearer can include at least one of the second set of session bearers 132, and the at least one target session bearer can include one of the first set of session bearers 131, such as the first session bearer 131(1). The mapping relationship indicates that the at least one of the second set of session bearers 132 is associated with the one of the first set of session bearers 131.

In an embodiment, the at least one source session bearer can be mapped to the at least one target session bearer based on respective QoS characteristics. In an example, a mapping signal can be received and processed by the electronic apparatus 120 to generate the mapping relationship. In an example, the mapping relationship can be obtained based on a mapping rule stored in the electronic apparatus 120. In some examples, the mapping relationship includes the mapping relationship, the mapping rule, and/or the like. Further, the mapping relationship can be updated based on one or more mapping signals.

The first network system 161A and the second network system 161B can be any suitable network capable of transmitting data between devices, such as between the electronic apparatus 120 and the data network 160, thus providing wireless services to the electronic apparatus 120. For example, the first and second network system 161A and 161B can be a service provider network including a wireless communication service provider network, a mobile service provider network, a machine type communication (MTC) network, a wired broadband network, and the like. The first network system 161A can further include a first access network 112A and a first core network 113A. The second network system 161B can include a second access network 112B and a second core network 113B. The first and second core network 113A and 113B can be connected to the data network 160, respectively.

The first and second access network 112A and 112B can be any suitable access network connecting the electronic apparatus 120 to the respective first and second core network 113A-113B using any suitable network technology, such as wired, wireless, fiber optical network, any suitable combination thereof, and the like. In an example, the first and second access network 112A-112B can be a radio access network (RAN), such as a Global System for Mobile Communications (GSM) RAN (GRAN), an Universal Mobile Telecommunications System (UMTS) RAN (UTRAN), an Evolved Universal Terrestrial RAN (EUTRAN), a fifth generation (5G) RAN or Next Generation (NG) RAN compliant with the 5G standard developed by the 3rd Generation Partnership Project (3GPP), and the like. The first and second access network 112A-112B can include a plurality of access network nodes, such as base stations, Node Bs (NBs), evolved Node Bs (eNBs), 5G next generation node Bs (gNBs), and the like.

The first and second core network 113A-113B can be any suitable network configured to provide services, such as authentication, accounting, QoS handling, and the like, to the electronic apparatus 120. In an example, the first and second core network 113A-113B can be a GSM/(General Packet Radio Service) GPRS core network used for GSM and Wideband Code Division Multiple Access (WCDMA), a core network compliant with the 4th Generation (4G) standard developed by 3GPP such as an evolved packet core (EPC), a 5G core network (5GC) compliant with the 5G standard developed by 3GPP, and the like. The first and second core network 113 can include a plurality of core network nodes, such as mobility management entity (MME), serving gateway (S-GW), packet data network (PDN) gateway (P-GW), home subscriber service (HSS) node, and the like used in the EPC, as well as access and mobility function (AMF), session management function (SMF), user plane function (UPF), user data management (UDM), and the like used in the 5GC.

In an embodiment, the first and second network system 161A-161B can be implemented using hardware components, software components, firmware components, any suitable combination thereof, and the like. The access network and core network nodes within a network system, such as the first and second network system 161A-161B, can be coupled together by any suitable network technology, such as wired, wireless, fiber optical network, any suitable combination thereof, and the like. The first and second network system 161A-161B can also be connected, for example, using the interface 180 and via any suitable network technology, such as wired, wireless, fiber optical network, any suitable combination thereof, and the like. In an example, the first network system 161A can be a 4G system (4GS) such as an evolved packet system (EPS) including an EUTRAN and an EPC, and the second network system 161B can be a 5G system (5GS) including a 5G RAN and a 5GC.

In another example, the second network system 161B can be a 5GS including an EUTRAN and a 5GC. The interface 180 can be a N26 interface between the EPC and the 5GC. In an example, the N26 interface can be between the MME in the EPC and the AMF in the 5GC.

In an embodiment, one or more first sessions including the first session 151 connecting the electronic apparatus 120 and the first core network 113A can be employed to provide wireless services to the electronic apparatus 120. The first session 151 can include the first set of session bearers 131. Each first session bearer 131(*i*) (1≤i≤n) can be configured to transmit data packets between the electronic apparatus 120 and the first core network 113A where i and n are positive integers and n is a number of first session bearers in the first session 151. One of the first set of session bearers 131 can be a first default session bearer. Data packets can be transmitted over each first session bearer 131(*i*) according to QoS characteristics (referred to as a first bearer QoS) of the respective first session bearer 131(*i*). Each first bearer QoS can be classified by a respective first bearer QoS identifier (ID), and can include packet forwarding characteristics, such as a type of each first session bearer 131(*i*), a priority level indicating a priority in scheduling resources, a packet delay budget, a packet loss rate, and the like. When there are multiple first session bearers 131(1)-(*n*) (n>1) in the first session 151, the first bearer QoS can be different, for example, reflected by the different first bearer QoS IDs. In an example, the first network system 161A is an EPS, and thus, the first session 151 is an EPS session, i.e., a PDN connection, each first session bearer 131(*i*) is an EPS bearer, and the respective first bearer QoS ID can be an EPS bearer ID (EBI). Accordingly, each first session bearer 131(*i*) can be characterized by the respective first bearer QoS including, for example, EPS bearer QoS parameters, such as a QoS class ID (QCI), allocation and retention priority (ARP), a guaranteed bit rate (GBR), a maximum bit rate (MBR), and the like. The first default session bearer can be a default EPS bearer.

A second session 152 and each second session bearer 132(*j*) (1≤j≤l) associated with respective second bearer QoS classified by a second bearer QoS ID of the second network system 161B are related to each other in a similar manner to the first session 151 and each first session bearer 131(*i*) associated with the respective first bearer QoS classified by the first bearer QoS ID where j and l are positive integers and l is a number of second session bearers in the second session 152. Thus, a detailed description is omitted for purposes of clarity. Similarly, one of the second set of session bearers 132 can be a second default session bearer. In an embodiment, a default session bearer, such as the first default session bearer and the second default session bearer, can be configured to transmit data packets not transmitted by other session bearers, thus, data packets for the other session bearers can be routed to the default session bearer.

In an example, the second network system 161B is a 5GS, and thus, the second session 152 is a packet data unit (PDU) session, each second session bearer 132(*j*) is a QoS flow, and the respective second bearer QoS ID can be a QoS flow ID (QFI). Accordingly, each second session bearer 132(*j*) can be characterized by the respective second bearer QoS including, for example, a QoS profile, one or more QoS rules, one or more service data flow (SDF) templates, and the like. A QoS profile can include QoS parameters such as 5G QoS ID (5QI), ARP, a reflective QoS attribute, a guaranteed flow bit rate (GFBR), a maximum flow bit rate (MFBR), and/or the like. The second default session bearer can be a QoS flow with a default QoS rule.

The first and second sessions, such as the first and second session 151-152, can be based on any suitable protocols, such as internet protocol (IP) and non-IP, IP version 4 (IPv4), IP version 6 (IPv6), Ethernet, Unstructured used in 5GC, and the like.

In the first session 151, each first session bearer 131(*i*) can be associated with a first access bearer (not shown) that connects the electronic apparatus 120 and the first access network 112A. Data packets transmitted over the first access bearer are also transmitted over the first session bearer 131(*i*) according to the respective first bearer QoS. On the other hand, in the second session 152, at least one of the second set of session bearers 132 can be associated with a second access bearer (not shown) that connects the electronic apparatus 120 and the second access network 112B. Therefore, data packets transmitted over the second access bearer can include an aggregate of data packets transmitted over the at least one of the second set of session bearers 132 according to different second bearer QoS when the at least one of the second set of session bearers 132 includes multiple second session bearers, such as the second session bearers 132(1)-(2).

In an example, uplink data packets transmitted from the electronic apparatus 120 to the second network system 161B can be matched to a second session bearer based on downlink data packets received from the second network system 161B using a reflective QoS rule in a 5GS.

The electronic apparatus 120 can be any suitable electronic apparatus configured to communicate with the first and second network system 161A-161B and receive wireless services. In an example, the electronic apparatus 120 can be configured to communicate with a 4G system, such as an EPS including an EUTRAN and an EPC, as well as a 5GS including a 5G RAN or EUTRAN and a 5GC. In an example, the electronic apparatus 120 is a terminal device used by an end-user for mobile telecommunication, such as a cell phone, a smart phone, a tablet computer, and the like. In another example, the electronic apparatus 120 is an MTC device (user equipment, UE), such as a wireless meter, a wireless sensor, a wireless actuator, and the like.

The electronic apparatus 120 can include a transceiver 122, a memory 123, processing circuitry 126, and the like. The transceiver 122 can communicate with the first and second network system 161A-161B, respectively. In an example, the transceiver 122 can communicate wirelessly with an access network node of the first or second access network 112A or 112B, such as an eNB, a gNB, and the like.

According to an aspect of the disclosure, the transceiver 122 can receive the mapping signal from, for example, the source network system, such as the second network system 161B, a 5GS, the second core network 113B, a 5GC, the first network system 161A, a 4GS, an EPS, the first core network 113A, an EPC, or the like. In an example, the mapping signal can be embedded in a message transmitted from a 5GC to the transceiver 122 when a PDU session is established or when a QoS flow is established. In an example, the mapping signal can be transmitted from a 5GC when a PDU session is modified. To establish the PDU session, the electronic apparatus 120 sends a PDU Session Establishment Request message to the 5GS. Subsequently, the electronic apparatus 120 receives a PDU Session Establishment Accept message from the 5GS. In an example, a QoS flow is established in the PDU session, and the PDU Session Establishment Accept message includes the mapping signal as follows: an EBI of an EPS bearer corresponding to the QoS flow. The QoS flow can be assigned an EBI, EPS bearer QoS parameters, and/or the like. In some examples, the mapping signal includes mapped EPS QoS parameters, mapped extended EPS QoS parameters, mapped traffic flow templates, and/or the like corresponding to the QoS flow. In an example, multiple QoS flows established in a PDU session can be associated with a same EPS bearer, and accordingly, the mapping signal can include a same EBI of the same EPS bearer corresponding to the multiple QoS flows.

In an example, the mapping signal can be embedded in a message transmitted from an EPC to the electronic apparatus 120 when a PDN session is established or when an EPS bearer is established, and can include information, such as one or more QFIs, one or more QoS rules, and/or the like, of one or more QoS flows corresponding to the EPS bearer established in the PDN session. When a QoS flow is associated with the EPS bearer, the information can include a QFI of the QoS flow. Alternatively, when the one or more QoS flows are associated with the EPS bearer, the information can include multiple QFIs of the multiple QoS flows, correspondingly.

The processing circuitry 126 can include an inter-system change module 127 configured to implement the inter-system change process. The inter-system change module 127 can be configured to process signals including the mapping signal used in the inter-system change process to generate the mapping rule, the mapping relationship, and the like. For example, the mapping rule can include a table with a set of session bearers for the first network system 161A and another set of session bearers for the second network system 161B that is associated with the set of session bearers. In an example, the set of session bearers can include the first set of session bearers 131 and other suitable session bearers for the first network system 161A, and the other set of session bearers can include the second set of session bearers 132 and other suitable session bearers for the second network system 161B. Subsequently, the mapping rule can be stored in the memory 123. In some examples, the inter-system change process can be implemented multiple times for the electronic apparatus 120, and the mapping rule can be updated accordingly. For example, the mapping rule can be obtained from a previous inter-system change of the electronic apparatus 120 from the target network system to the source network system. Subsequently, during the current inter-system change of the electronic apparatus 120 from the source network system to the target network system, the mapping rule can be updated based on one or more mapping signals received from the source network system. The mapping rule can also be determined based on QoS characteristics of the first and the second set of session bearers 131 and 132. The mapping rule can also be preconfigured on the electronic apparatus 120.

The inter-system change module 127 can be configured to obtain the mapping relationship between the at least one source session bearer and the at least one target session bearer, for example, based on the mapping signal, the mapping rule, or the like. In the first embodiment, the source and target network systems are the first and second network systems 161A and 161B, respectively. The mapping relationship can specify that a source session bearer, such as the first session bearer 131(1), is associated with one or more target session bearers, such as the second session bearers 132(1)-(2). In the second embodiment, the source and target network systems are the second and first network systems 161B and 161A, respectively. The mapping relationship can specify that one or more source session bearers, such as the second session bearer 132(1)-(2), are associated with a target session bearer, such as the first session bearer 131(1).

In general, the electronic apparatus 120 can be configured to have various operation modes, such as an idle mode, a connected mode, or the like. In the idle mode, the electronic apparatus 120 may not have active connection with a network system, such as the first network system 161A or the second network system 161B, but can monitor available communication channels to receive information, such as broadcast information, system information, paging information, from the network system. The electronic apparatus 120 can select and camp on a suitable cell in a process known as 'cell selection'. A cell can refer to a physical area with radio coverage by an access network node, such as in the first access network 112A or in the second access network 112B. While camping on the suitable cell in the idle mode, the electronic apparatus 120 can monitor other cells and determine to reselect and camp on another cell, for example, due to mobility of the electronic apparatus 120, in a process known as 'cell reselection'. On the other hand, the electronic apparatus 120 can be connected to a network system in the connected mode where the electronic apparatus 120 can receive and transmit signals from/to the network system. While in the connected mode, the electronic apparatus 120 can be switched from being connected to a serving cell to a neighboring cell in a process known as 'handover', for example, due to mobility of the electronic apparatus 120.

The inter-system change module 127 can be configured to map the at least one source session bearer to the at least one target session bearer based on the mapping relationship in any suitable mode, such as the idle mode, the connected mode, or the like. Accordingly, the inter-system change module 127 can be configured to map the at least one source session bearer to the at least one target session bearer by using inter-system cell reselection procedures or inter-system handover procedures between the source network system and the target network system.

The memory 123 can include an inter-system change memory 124 and a program memory 125. The inter-system change memory 124 can be configured to store information used in the inter-system change process including, for example, the mapping relationship and the mapping rule. The program memory 125 can be configured to store instructions to control operations of the electronic apparatus 120. The memory 123 can be any suitable memory including non-volatile memory such as one or more non-volatile memory chips, volatile memory such as random access memory (RAM), or any suitable combination thereof.

In an embodiment, the electronic apparatus 120 can be a system-on chip (SOC) where components, such as the transceiver 122, the memory 123, and the processing circuitry 126, are located on a single integrated circuit (IC) chip. Alternatively, the components in the electronic apparatus 120 can be distributed across multiple ICs. In an embodiment, the processing circuitry 126 can be implemented using hardware components, software components, firmware components, or any combination thereof. In an example, the software implementing the inter-system change process can be stored in the program memory 125 and be executed by hardware components located in the processing circuitry 126.

During operation, the electronic apparatus 120 is configured to switch from being served by the source network system to being served by the target network system. As described above, in the first embodiment, the source network system is the first network system 161A and the target network system is the second network system 161B. In an example, the first network system 161A is an EPS and the second network system 161B is a 5GS. The first session 151, such as a PDN session, is established between the electronic apparatus 120 and the first core network 113A, such as an EPC, and includes the first session bearers 131(1)-(2) where n=2. The first session bearer 131(1) is a first EPS bearer having a first EBI, and the first session bearer 131(2) a second EPS bearer having a second EBI. Further, a mapping signal is received by the transceiver 122 from the EPC indicating that a first QFI and a second QFI are associated with the first session bearer 131(1) or the first EBI, and a third QFI is associated with the first session bearer 131(2) or the second EBI. The first QFI, the second QFI, and the third QFI correspond to a first QoS flow, a second QoS flow, and a third QoS flow, respectively. Alternatively, the mapping signal can indicate that the first EPS bearer is assigned a first QoS rule indicating the first QFI and a second QoS rule indicating the second QFI and the second EPS bearer is assigned a third QoS rule indicating the third QFI.

Due to mobility of the electronic apparatus 120, the inter-system change process occurs, for example, between a S1 mode in the EPS and a N1 mode in the 5GS. During the inter-system change process, the source session bearer is identified to be the first EPS bearer. The mapping relationship can be obtained based on the mapping signal. In the example described above, the mapping signal indicates that the first EBI is associated with the first QFI and the second QFI or the first EBI is assigned the first QoS rule and the second QoS rule, and thus, the source session bearer (i.e., the first EPS bearer) is associated with the first QoS flow and the second QoS flow. The first QoS flow and the second QoS flow correspond to the at least one target session bearer, for example, the second session bearers 132(1)-(2). Subsequently, the source session bearer can be mapped to the at least one target session bearer, i.e., the first EPS bearer associated with the EPS can be mapped to the first QoS flow and the second QoS flow associated with the 5GS, respectively. Therefore, the first EPS bearer can be separated into multiple QoS flows including the first QoS flow and the second QoS flow. Similarly, other first session bearers, such as the second EPS bearer can be mapped to the third QoS flow. The above description can be suitably adapted to the second embodiment where the source network system is the second network system 161B and the target network system is the first network system 161A.

The inter-system change process can be repeated for additional cell reselection or handover processes between the first network system 161A and the second network system 161B. For example, the electronic apparatus 120 is initially connected to the first network system 161A and the first session bearers 131(1)-(2) are established. The first session bearers 131(1)-(2) are associated with the first EBI and the second EBI, respectively. A first mapping signal indicates that a first QFI and a second QFI are associated with the first EBI, and a third QFI is associated with the second EBI. During a first inter-system change process from the first network system 161A to the second network system 161B, the mapping relationship can be determined based on the first mapping signal. The mapping rule including the above information can also be determined based on the first mapping signal and stored in the inter-system change memory 124. Subsequently, due to mobility of the electronic apparatus 120, a second inter-system change process from the second network system 161B to the first network system 161A can be implemented. In an example, a mapping relationship for the second inter-system change process can be obtained from the stored mapping rule that is determined for the first inter-system change process, and thus, a mapping signal is not needed. Additional mapping signals can be received and processed, and the mapping rule can be updated accordingly. In an example, the mapping rule can be revised. In an example, additional rules can be appended to the mapping rule.

Figure 2:
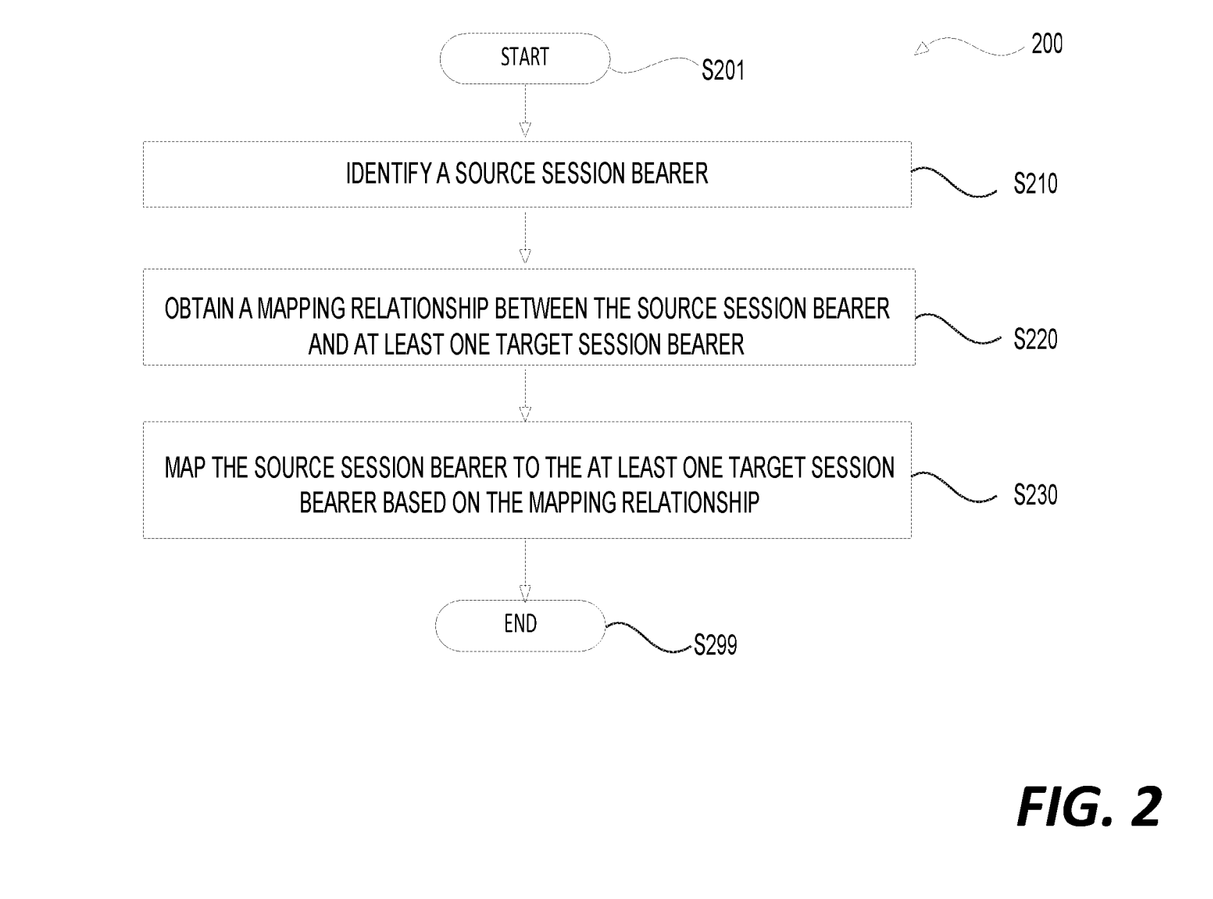
FIG. 2 shows a flow chart outlining an exemplary process 200 according to an embodiment of the disclosure.

FIG. 2 shows a flow chart outlining an exemplary process 200 according to an embodiment of the disclosure. In an example, the process 200 can be executed by the communication system 100 in FIG. 1 to implement the inter-system change process. For purposes of clarity, the process 200 is described using the first embodiment, and the electronic apparatus 120 is switched from being served by the first network system 161A (a source network system) to the second network system 161B (a target network system).

The process 200 starts at S201. The electronic apparatus 120 is served by the source network system via a source session having a set of source session bearers. The electronic apparatus 200 can be in an idle mode or in a connected mode in the source network system. In the first embodiment, the source session is the first session 151, the set of source session bearers is the first set of session bearers 131. In a first example of the first embodiment, the first set of session bearers 131 includes the first session bearers 131(1)-(2).

As described above, a mapping signal can be received, for example, when the first session 151 is established or modified. The mapping signal can indicate how the set of source session bearers are associated with a set of target session bearers, i.e., the second set of session bearers 132. In the first example, the mapping signal can indicate that the second session bearers 132(1)-(2) are associated with the first session bearer 131(1), and the second session bearer 132(3) is associated with the first session bearer 131(2). Alternatively or additionally, as described above, a mapping rule with similar information can be stored in the electronic apparatus 120. For example, the mapping rule can include a relationship between the first set of session bearers 131 (such as specified by a set of first bearer QoS IDs) and the second set of session bearers 132 (such as specified by a set of second bearer QoS IDs). The inter-system change process can occur due to, for example, mobility of the electronic apparatus 120. The process 200 then proceeds to S210.

At S210, a source session bearer to be mapped to the target network system can be identified. In the first example of the first embodiment, the source session bearer is identified to be the first session bearer 131(1).

At S220, a mapping relationship is obtained between the source session bearer and at least one target session bearer associated with the target network system. As described above, the mapping relationship can be obtained by the electronic apparatus 120 based on the mapping signal, the mapping rule, and/or the like. In the first example, the mapping relationship can be obtained based on the mapping signal and can indicate that the first session bearer 131(1) is to be mapped to the second session bearers 132(1)-(2) where the at least one target session bearer includes multiple session bearers, i.e., the second session bearers 132(1)-(2). Alternatively, the mapping relationship can be obtained based on the mapping rule when the mapping rule is available. In an example, the mapping rule can be preconfigured or obtained from a previous mapping signal received in a previous inter-system change process from the second network system 161B to the first network system 161A.

At S230, the source session bearer can be mapped to the at least one target session bearer based on the mapping relationship. In the first example described above, the first session bearer 131(1) can be mapped to the second session bearers 132(1)-(2), for example, by using inter-system cell reselection procedures between the first network system 161A and the second network system 161B when the electronic apparatus 120 is in the idle mode. The first session bearer 131(1) can be mapped to the second session bearers 132(1)-(2), for example, by using inter-system handover procedures between the first network system 161A and the second network system 161B when the electronic apparatus 120 is in the connected mode. The process 200 then proceeds to S299, and terminates.

The process 200 can be suitably adapted. Certain steps can be repeated for additional source session bearers to be mapped. For example, the steps S210, S220, and S230 can be repeated for the first session bearer 131(2) so that the first session bearer 131(2) can be mapped to the second session bearer 132(3). Certain steps can be omitted or combined. For example, the step S220 can be omitted or combined with the step S230. Therefore, the steps S220 and S230 can map the identified source session bearer to the at least one target session bearer based on the mapping relationship that matches the identified source session bearer with the at least one target session bearer to be established between the electronic apparatus 120 and the target network system.

In a second example of the first embodiment, the first network system 161A and the second network system 161B are an EPS and a 5GS, respectively. Accordingly, the source and target network system are the EPS and the 5GS, respectively. For example, the process 200 is executed to implement the inter-system change for the electronic apparatus 120 between the S1 mode in the EPS to the N1 mode in the 5GS.

The process 200 starts at S201. The first session 151, i.e., a PDN connection, can be established. The PDN connection can include a first EPS bearer and a second EPS bearer that are the first session bearers 131(1)-(2), respectively. The first EPS bearer can have a first EBI characterized by first EPS bearer QoS parameters such as a first QCI, and the like and the second EPS bearer can have a second EBI characterized by second EPS bearer QoS parameters such as a second QCI, and the like.

A mapping signal can be received, for example, when the PDN connection is established or modified. In an embodiment, the mapping signal can be received in the protocol configuration options information element (IE), extended protocol configuration options IE in the Activated Default EPS Bearer Request message, Activated Dedicated EPS Bearer Request message, Modify EPS Bearer Request message, and/or the like. In the second example, the mapping signal can indicate that a first QoS flow and a second QoS flow are associated with the first EPS bearer and a third QoS flow is associated with the second EPS bearer. The first QoS flow, the second QoS flow, and the third QoS flow are the respective second session bearers 132(1)-(3), and can be indicated by a first QFI, a second QFI, and a third QFI, respectively. The inter-system change process can occur due to, for example, mobility of the electronic apparatus 120. The process 200 then proceeds to S210.

At S210, the source session bearer is identified to be the first EPS bearer.

At S220, a mapping relationship is obtained between the first EPS bearer and at least one target session bearer associated with the 5GS. In the second example, the mapping relationship can be obtained based on the mapping signal and can indicate that the first EPS bearer is to be mapped to the first QoS flow and the second QoS flow where the at least one target session bearer includes multiple QoS flows in the 5GS, i.e., the first QoS flow and the second QoS flow. Alternatively, the mapping relationship can be obtained based on the mapping rule when the mapping rule is available. The mapping rule can include a relationship between EPS bearers for the EPS indicated by, for example, EBIs, QCIs, and/or the like, and QoS flows indicated by QFIs, 5QIs, QoS rules, and/or the like for the 5GS. In an example, the mapping rule can be obtained from a previous mapping signal received in a previous inter-system change process from the 5GS to the EPS.

At S230, the first EPS bearer can be mapped to the first QoS flow and the second QoS flow, for example, by using inter-system cell reselection procedures between the EPS and the 5GS when the electronic apparatus 120 is in the idle mode or using inter-system handover procedures between the EPS and the 5GS when the electronic apparatus is in the connected mode.

In an example, the electronic apparatus 120 is in the idle mode, the electronic apparatus 120 is configured to perform a registration procedure for mobility. With the coordination between EPS Session Management (ESM) and 5GS Session Management (5GSM), the electronic apparatus 120 is configured to locally finish a PDN connection to a PDU session transfer before a 5GS Mobility Management (5GMM) message (e.g., registration request) is sent.

In an example, the electronic apparatus 120 is in the connected mode, with the coordination between 5GMM and EPS Mobility Management (EMM), the inter-system handover procedures can be performed. In an example, radio resource control (RRC) Connection Release with redirection to NG RAN is performed. With the coordination between the ESM and the 5GSM, a PDN connection to a PDU session transfer can start upon receipt of an Access Stratum (AS) layer indication of the inter-system change.

The process 200 then proceeds to S299, and terminates.

Figure 3:
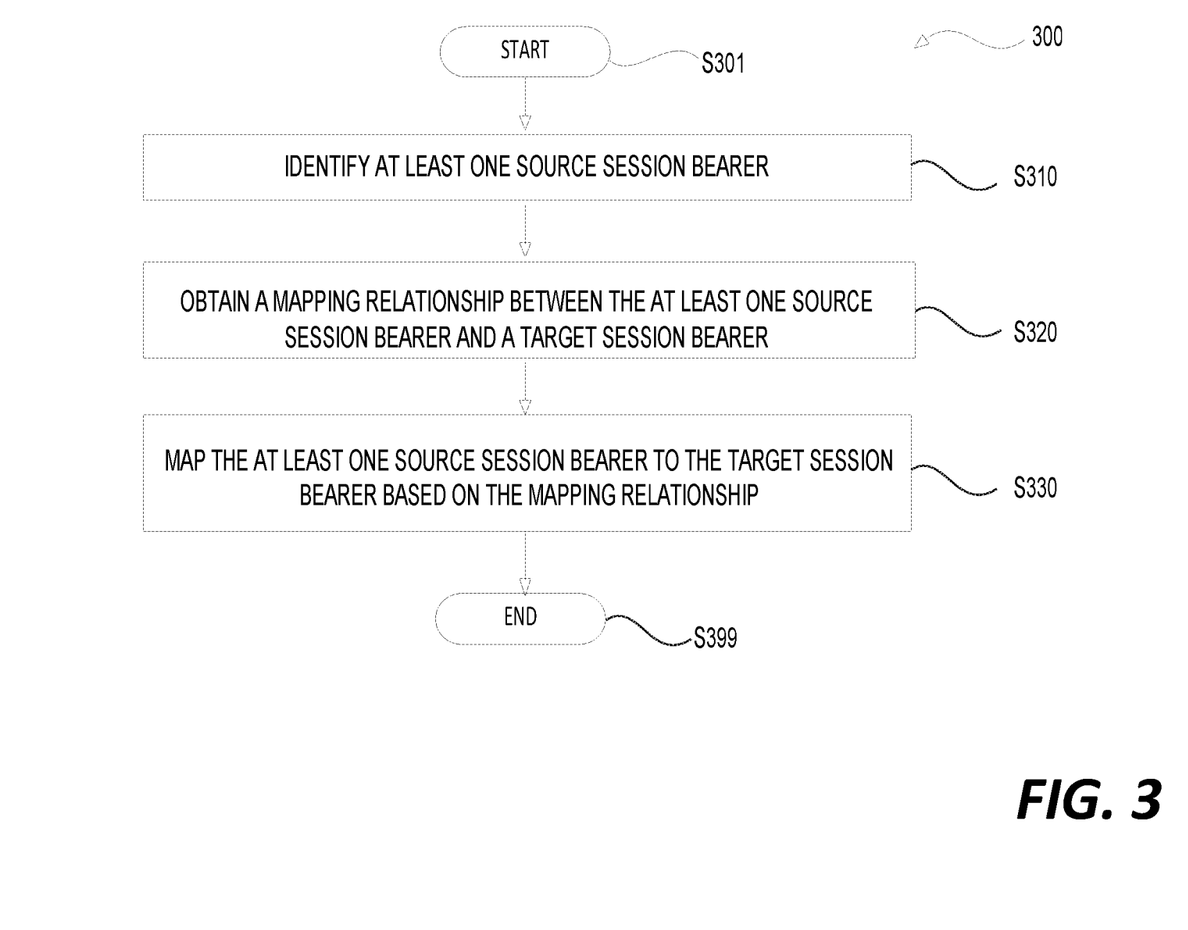
FIG. 3 shows a flow chart outlining an exemplary process 300 according to an embodiment of the disclosure.

FIG. 3 shows a flow chart outlining an exemplary process 300 according to an embodiment of the disclosure. In an example, the process 300 can be executed by the communication system 100 in FIG. 1 to implement the inter-system change process. For purposes of clarity, the process 300 is described using the second embodiment, and the electronic apparatus 120 is switched from being served by the second network system 161B (a source network system) to the first network system 161A (a target network system).

The process 300 starts at S301. The electronic apparatus 120 is served by the source network system via a source session having a set of source session bearers. The electronic apparatus 120 can be in an idle mode or in a connected mode in the source network system. In the second embodiment, the source session is the second session 152, the set of source session bearers is the second set of session bearers 132. In a first example of the second embodiment, the second set of session bearers 132 includes the second session bearers 132(1)-(3) where 1 is 3.

As described above, a mapping signal can be received, for example, when the second session 152 is established or modified. The mapping signal can indicate how the set of source session bearers are associated with a set of target session bearers, i.e., the first set of session bearers 131. In the first example, the mapping signal can indicate that the first session bearers 131(1) is associated with the second session bearers 132(1)-(2), and the first session bearer 131(2) is associated with the second session bearer 132(3). Similarly, a mapping rule can be stored in the electronic apparatus 120. The inter-system change process can occur due to, for example, mobility of the electronic apparatus 120. The process 300 then proceeds to S310.

At S310, at least one source session bearer to be mapped to the target network system can be identified. In the first example of the second embodiment, the at least one source session bearer is identified to be the second session bearers 132(1)-(2).

At S320, a mapping relationship is obtained between the at least one source session bearer and a target session bearer associated with the target network system. As described above, the mapping relationship can be obtained by the electronic apparatus 120 based on the mapping signal and/or the mapping rule. In the first example, the mapping relationship can be obtained based on the mapping signal and can indicate that the second session bearers 132(1)-(2) are to be mapped to the target session bearer (i.e., the first session bearer 131(1)) where the at least one source session bearer includes multiple session bearers, i.e., the second session bearers 132(1)-(2). Similarly, the mapping relationship can be obtained based on the mapping rule when the mapping rule is available. In an example, the mapping rule can be obtained from a previous mapping signal received in a previous inter-system change process from the first network system 161A to the second network system 161B, such as described in the process 200.

At S330, the at least one source session bearer can be mapped to the target session bearer based on the mapping relationship similar to that described at S230 in the first example of the first embodiment, and thus, the detailed description is omitted for purposes of clarity. The process 300 then proceeds to S399, and terminates.

The process 300 can be suitably adapted. Certain steps can be repeated for additional source session bearers to be mapped. For example, the steps S310, S320, and S330 can be repeated for the second session bearer 132(3) so that the second session bearer 132(3) can be mapped to the first session bearer 131(2). Certain steps can be omitted or combined. For example, the step S320 can be omitted or combined with the step S330. Therefore, the steps S320 and S330 can map the at least one source session bearer to the target session bearer based on the mapping relationship that matches the at least one source session bearer with the target session bearer to be established between the electronic apparatus 120 and the target network system.

In a second example of the second embodiment, the first network system 161A and the second network system 161B are an EPS and a 5GS, respectively. Accordingly, the source and target network system are the 5GS and the EPS, respectively. For example, the process 300 is executed to implement the inter-system change for the electronic apparatus 120 from the N1 mode in the 5GS to the S1 mode in the EPS.

The process 300 starts at S301. The second session 152, i.e., a PDU session, can be established. The PDU session can include a first QoS flow, a second QoS flow, and a third QoS flow that are the second session bearers 132(1)-(3), respectively. The first QoS flow can have a first QFI characterized by a first QoS profile including a first 5QI, a first QoS rule, and the like. The second QoS flow can have a second QFI characterized by a second QoS profile including a second 5QI, a second QoS rule, and the like. The third QoS flow can have a third QFI characterized by a third QoS profile including a third 5QI, a third QoS rule, and the like.

A mapping signal can be received, for example, when the PDU session is established or modified. In the second example of the second embodiment, the mapping signal can indicate that a first EPS bearer is associated with the first QoS flow and the second QoS flow. Additionally, the mapping signal can also indicate that a second EPS bearer is associated with the third QoS flow. The first EPS bearer and the second EPS bearer are the respective first session bearers 131(1)-(2), and can be indicated by a first EBI and a second EBI, respectively. A mapping rule can be similar to that described in the second example of the first embodiment. The inter-system change process can occur due to, for example, mobility of the electronic apparatus 120. The process 300 then proceeds to S310.

At S310, the at least one source session bearer is identified to be the first QoS flow and the second QoS flow, and thus includes multiple QoS flows in the 5GS.

At S320, a mapping relationship is obtained between the first QoS flow and the second QoS flow in the 5GS and a target session bearer associated with the EPS. In the second example, the mapping relationship can be obtained based on the mapping signal and can indicate that the first QoS flow and the second QoS flow are to be mapped to the first EPS bearer. Alternatively, the mapping relationship can be obtained based on the mapping rule when the mapping rule is available. In an example, the mapping rule can be obtained from a previous mapping signal received in a previous inter-system change process from the EPS to the 5GS.

At S330, the first QoS flow and the second QoS flow can be mapped to the first EPS bearer similar to that described at S230 in the second example of the first embodiment, and thus, the detailed description is omitted for purposes of clarity.

In an example, the electronic apparatus 120 is in the idle mode, the electronic apparatus 120 is configured to perform a Tracking Area Update (TAU) procedure or an Attach procedure. With the coordination between the 5GSM and the ESM, the electronic apparatus 120 is configured to locally finish a PDU session to a PDN connection transfer before an EMM message (e.g., a TAU request, an Attach request) is sent.

In an example, the electronic apparatus 120 is in the connected mode, with the coordination between the 5GMM and the EMM, the inter-system handover procedures can be performed. In an example, RRC Connection Release with redirection to EUTRAN is performed. With the coordination between the 5GSM and the ESM, a PDU session to a PDN connection transfer can start upon receipt of an AS layer indication of the inter-system change.

The process 300 then proceeds to S399, and terminates.

In some examples, after the inter-system change from the N1 mode in the 5GS to the S1 mode in the EPS, a PDU session identity, single network slice selection assistance information (S-NSSAI), session-aggregated maximum bit rate (AMBR) can be associated with a default EPS bearer context. For each EPS bearer context mapped from one or more QoS flows, such as the first QoS flow and the second QoS flow, respective QoS rule(s) and QoS flow description(s) for the one or more QoS flows can be associated with the respective EPS bearer context.

In addition to examples described with reference to FIGS. 2-3. Multiple first session bearers, such as the first session bearers 131(1)-(2) can be mapped into a single second session bearer, such as the second session bearer 132(1). Further, a single second session bearer, such as the second session bearer 132(1), can be mapped into multiple first session bearers, such as the first session bearers 131(1)-(2). For example, when the first network system 161A and the second network system 161B are an EPS and a 5GS, respectively, the first session bearers 131(1)-(2) are a first EPS bearer and a second EPS bearer, and the second session bearer 132(1) is a QoS flow. Therefore, the first EPS bearer and the second EPS bearer can be mapped to the single QoS flow when the EPS is the source network system, and the single QoS flow can be mapped into the first EPS bearer and the second EPS bearer when the 5GS is the source network system.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What claimed is:

1. An electronic apparatus for wireless communication, comprising processing circuitry configured to:
   identify, during a current inter-system change of the electronic apparatus from a source network system to a target network system, at least one source session bearer between the electronic apparatus and the source network system;
   map the at least one identified source session bearer to at least one target session bearer based on a mapping rule indicating that the at least one source session bearer is associated with the at least one target session bearer to be established between the electronic apparatus and the target network system, wherein the mapping rule is obtained from a previous inter-system change of the electronic apparatus from the target network system to the source network system; and
   determine the mapping rule based on quality of service (QoS) characteristics of the at least one source session bearer and the at least one target session bearer.

2. The electronic apparatus of claim 1, wherein the source network system is a fourth generation (4G) wireless communication network system, the target network system is a fifth generation (5G) wireless communication network system, the at least one identified source session bearer is an evolved packet system (EPS) bearer, and the at least one target session bearer comprises one or more QoS flows.

3. The electronic apparatus of claim 2, wherein
   the mapping relationship indicates that the EPS bearer is associated with the one or more QoS flows; and
   the processing circuitry is configured to map the EPS bearer to the one or more QoS flows.

4. The electronic apparatus of claim 1, wherein the electronic apparatus is in one of: an idle mode and a connected mode.

5. The electronic apparatus of claim 2, wherein
   the electronic apparatus further comprises a transceiver configured to receive, from the 4G wireless communication network system, a mapping signal indicating that the EPS bearer is associated with the one or more QoS flows; and
   the processing circuitry is further configured to process the mapping signal to obtain the mapping relationship.

6. The electronic apparatus of claim 1, wherein the source network system is a 5G wireless communication network system, the target network system is a 4G wireless communication network system, the at least one identified source session bearer comprises one or more QoS flows, and the at least one target session bearer is an EPS bearer.

7. The electronic apparatus of claim 6, wherein
   the mapping relationship indicates that the one or more QoS flows are associated with the EPS bearer; and
   the processing circuitry is configured to map the one or more QoS flows to the EPS bearer.

8. The electronic apparatus of claim 6, wherein
   the electronic apparatus further comprises a transceiver configured to receive, from the 5G wireless communication network system, a mapping signal comprising an EPS bearer identifier of the EPS bearer corresponding to the one or more QoS flows; and
   the processing circuitry is further configured to process the mapping signal to obtain the mapping relationship.

9. A method for wireless communication, comprising:
   identifying, by processing circuitry of an electronic apparatus during a current inter-system change of the electronic apparatus from a source network system to a target network system, a source session bearer between the electronic apparatus and the source network system;
   mapping the identified source session bearer to at least one target session bearer based on a mapping rule indicating that the at least one source session bearer is associated with the at least one target session bearer to be established between the electronic apparatus and the target network system, wherein the mapping vile is obtained from a previous inter-system change of the electronic apparatus from the target network system to the source network system; and
   determining the mapping rule based on quality of service (QoS) characteristics of the at least one source session bearer and the at least one target session bearer.

10. The method of claim 9, wherein the source network system is a 4G wireless communication network system, the target network system is a 5G wireless communication network system, the identified source session bearer is an evolved packet system (EPS) bearer, and the at least one target session bearer comprises one or more QoS flows.

11. The method of claim 10, wherein
   the mapping relationship indicates that the EPS bearer is associated with the one or more QoS flows; and
   mapping the identified source session bearer to the at least one target session bearer includes mapping the EPS bearer to the one or more QoS flows.

12. A method for wireless communication, comprising:
   identifying, by processing circuitry of an electronic apparatus during a current inter-system change of the electronic apparatus from a source network system to a target network system, at least one source session bearer between the electronic apparatus and the source network system;
   mapping the at least one identified source session bearer to a target session bearer based on a mapping rule indicating that the at least one source session bearer is associated with the at least one target session bearer to be established between the electronic apparatus and the target network system, wherein the mapping rule is obtained from a previous inter-system change of the electronic apparatus from the target network system to the source network system; and
   determining the mapping rule based on quality of service (QoS) characteristics of the at least one source session bearer and the at least one target session bearer.

13. The method of claim 12, wherein, the source network system is a 5G wireless communication network system, the target network system is a 4G wireless communication network system, the at least one identified source session bearer comprises one or more QoS flows, and the target session bearer is an EPS bearer.

14. The method of claim 13, wherein
   the mapping relationship indicates that the one or more QoS flows are associated with the EPS bearer; and mapping the at least one identified source session bearer to the target session bearer includes mapping the one or more QoS flows to the EPS bearer.

15. The electronic apparatus of claim 3, wherein the electronic apparatus further comprises a transceiver configured to receive a mapping signal indicating that a first EPS bearer identifier (EBI) is associated with a first QoS flow ID (QFI) and a second QFI, or the first EBI is assigned a first QoS rule and a second QoS rule, and the at least one source session bearer is associated with a first QoS flow and a second QoS flow of the one or more QoS flows.

* * * * *